Jan. 12, 1926. 1,569,733

F. E. FANSLER

STEERING MECHANISM FOR AUTOMOBILES

Filed June 26, 1924

Inventor

Frederick E. Fansler:

By

Attorney

Patented Jan. 12, 1926.

1,569,733

UNITED STATES PATENT OFFICE.

FREDERICK E. FANSLER, OF ACTON, INDIANA.

STEERING MECHANISM FOR AUTOMOBILES.

Application filed June 26, 1924. Serial No. 722,614.

*To all whom it may concern:*

Be it known that I, FREDERICK E. FANSLER, a citizen of the United States, residing at Acton, in the county of Marion and State of Indiana, have invented certain new and useful Improvements in Steering Mechanism for Automobiles, of which the following is a specification.

My said invention relates to an automobile steering control and anti-rattling device for attachment to the front axle and tie rod of automobiles and when used on certain types of automobiles having a steering rod connected to the end of the tie rod as, for example, on Fords and the like, it is also provided for attachment to the steering rod.

The object of the invention is to stabilize and facilitate the steering of automobiles on rough roads and to reduce the tendency of the parts to wear and rattle in their bearings.

Figure 1:
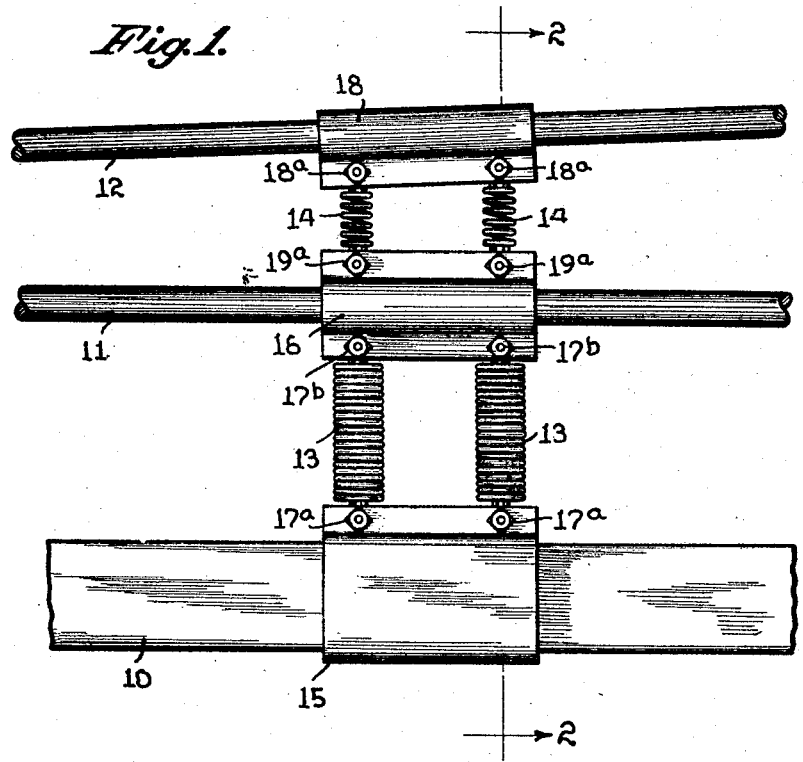
Figure 2:
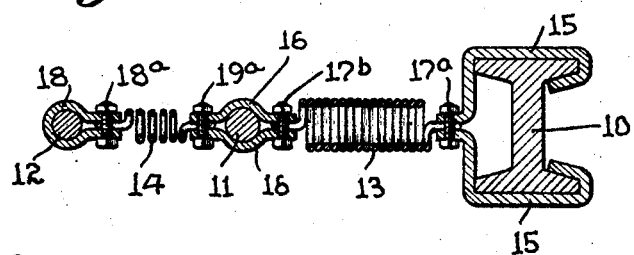
Figure 3:
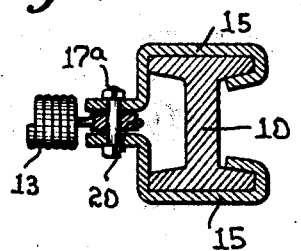

Referring to the accompanying drawings which are made a part hereof and on which similar reference characters indicate similar parts, Fig. 1 is a detail view showing portions of the front axle tie rod and steering rod having my device applied thereto, Fig. 2 is a longitudinal vertical section taken on the line 2—2 Fig. 1, Fig. 3 is a detail view showing the preferred mode of attaching the ends of the springs to the clamping elements.

In the drawings reference character 10 indicates the front axle of an automobile having a tie rod 11 and a steering rod 12; the axle 10 and tie rod 11 are in substantially the same horizontal plane while the steering rod 12 extends at an angle to the plane of the tie rod and axle and is increasingly elevated from said plane.

Extending between the axle 10 and the tie rod 11 at substantially right angles thereto and preferably intermediate their ends are a pair of coiled springs 13 which have their ends secured between the sides of an axle clamping element 15 and a tie rod clamping element 16 carried by the axle and tie rod respectively. An additional pair of preferably much weaker coiled springs 14 are provided between the tie rod 11 and steering rod 12, said springs having their ends secured between the sides of the tie rod clamping element 16 and the steering rod clamping element 18.

The axle clamping element 15, the tie rod clamping element 16 and the steering rod clamping element 18 are preferably formed from sheet metal of about ⅛ of an inch in thickness and 4 to 6 inches in width. Said clamping element 15 comprises a pair of correspondingly shaped members having their forward ends turned inwardly and rearwardly to engage the upper and lower edges of the conventional I-beam axle. The rear ends of said similarly formed members are correspondingly apertured for the reception of bolts 17ª and by means of which the ends of the springs 13 and the axle clamping element are firmly secured in position on the axle.

The tie rod clamping element 16 comprises a pair of similarly shaped members having semi-cylindrical depressions with flanges extending from the opposite sides thereof, said flanges being provided with apertures for the reception of bolts 17ᵇ and 19ª and by means of which the ends of the springs 13 and 14 and the tie rod clamping element are firmly secured on the tie rod 11. As shown in Fig. 3, means is provided for permitting a slight movement of the end of the spring with reference to the clamping member to which it is fastened. This prevents any unnecessary strain on the end of the spring and obviates the breaking of the hooked end of the spring. As shown spacing elements 20 formed of disks having grooved or cupped peripheries are inserted on the bolts between the ends of the clamping members and are freely rotatable thereon to allow necessary movement of the springs. Obviously the elements 20 might be used or dispensed with at the end of each spring but from experience I find it sufficient to use the same only at the ends of the springs 13.

The steering rod clamping element comprises a member having a cylindrical body portion with substantially perpendicular flanges extending from one edge, said flanges provided with apertures for the reception of bolts 18ª and by means of which the ends of the springs 14 and the steering rod clamping element are fastened on the steering rod.

In the use of my invention when the clamping elements are clamped around the axle, tie rod and steering rod, midway between the front wheels, any tendency of the wheels to turn in either direction will be avoided and ordinarily the wheels will follow a straight course and upon encountering any obstruction in the road will yield sufficiently to allow the obstruction to be overcome or avoided and will then bring the wheels back to their proper position. Any deflection of the car from its course is accordingly prevented and the wheels are promptly brought back in line by the action of the springs. In previous devices of this nature only a single spring has been used, and then only between the axle and tie rod, however, by providing spaced springs as shown, when one wheel strikes an obstruction the opposite wheel is suddenly forced forward and as a result of which there is a tendency on the part of the opposite wheel to respond with a sudden compensating movement forward and the course of the car deflected. Such tendency is counteracted and the wheels are promptly brought back to normal position by the semi-resisting action of the spring which is positioned the nearer to it the ultimate effect of which is to reduce the strain on the driver. This result has been very materially felt in the operation of a Ford automobile the device having been found to be very effective in relieving the driver of strain and in preventing undue rattling of the parts.

Having thus fully described my invention, what I claim as new and desire to secure by Letters Patent, is:

1. A stabilizing and anti-rattling device for the steering mechanism of an automobile comprising clamping elements for attachment to the front axle, tie rod and steering rod of an automobile, a spring member connecting said axle and tie rod clamping element and an additional spring member between said tie rod and steering rod clamping elements, substantially as set forth.

2. A stabilizing and anti-rattling device for the steering mechanism of an automobile comprising a spring member between the axle and tie rod of an automobile, a spring member between the tie rod and steering rod of said automobile and means for securing the ends of said spring members to said axle, tie rod and steering rod of said automobile, substantially as set forth.

3. The combination in an automobile, of a clamp secured to the axle intermediate its ends, a roller between the jaws of said clamp, a second clamp secured to the tie rod in opposed relation to said first-mentioned clamp, a roller between the jaws of said last-mentioned clamp, and a spring member having one end encircling the periphery of each of said rollers, substantially as set forth.

In witness whereof, I have hereunto set my hand and seal at Acton, Indiana, this 18th day of June, A. D. nineteen hundred and twenty-four.

FREDERICK E. FANSLER. [L. S.]